E. COLEMAN.
Amalgamating-Pan.

No. 222,019.   Patented Nov. 25, 1879.

Witnesses:
W. Floyd Quckett
D. B. Lawler

Inventor:
Ezra Coleman
per Jno. L. Boone
Attorney.

UNITED STATES PATENT OFFICE.

EZRA COLEMAN, OF SAN FRANCISCO, CALIFORNIA.

IMPROVEMENT IN AMALGAMATING-PANS.

Specification forming part of Letters Patent No. 222,019, dated November 25, 1879; application filed June 30, 1879.

*To all whom it may concern:*

Be it known that I, EZRA COLEMAN, of the city and county of San Francisco, and State of California, have invented certain Improvements in Amalgamating-Pans; and I do hereby declare that the following is a full, clear, and exact description thereof, reference being had to the accompanying drawings.

In the process of amalgamation the centrifugal action produced by the rotation of the muller induces an outward current of the pulp toward and against the sides of the amalgamating-pan, and this action, in connection with the rotary motion of the pulp, would naturally cause the greater portion of the pulp to travel around close to the side of the pan were not means provided for returning it to the center, so that it will be passed successively under the muller. To do this wings or deflectors are secured to the side of the pan at intervals, so that the pulp is thrown to the circumference by the centrifugal action and returned again by the deflectors. The angle at which these wings or deflectors have heretofore been placed was determined by the manufacturer of the pans where the pans were made, as they were made rigid and fixed to the pan in its original construction. Amalgamators, however, differ as to the proper angle, and some even contend that the angle should depend in a measure on the character of the pulp.

My invention consists in hinging or otherwise flexibly attaching the wings or deflectors to the side of the pan, so that their angle can be adjusted as desired, and secured in whatever position they are adjusted to by the attendant. This can be done in a variety of ways; but the plan which I have adopted is represented in the accompanying drawings, in which—

Figure 1:
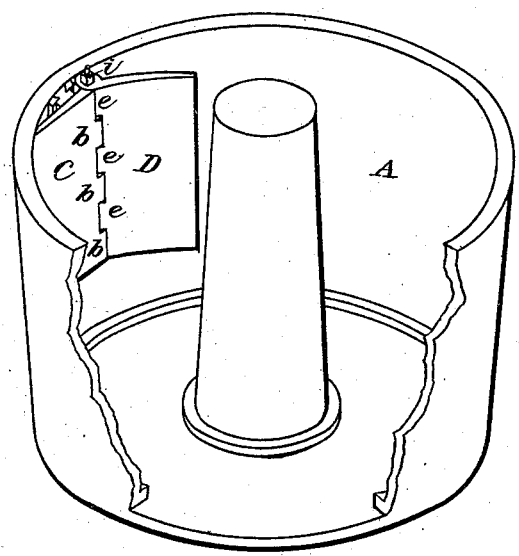
Figure 2:
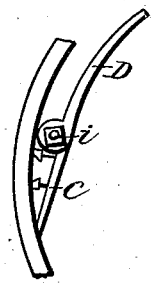
Figure 3:
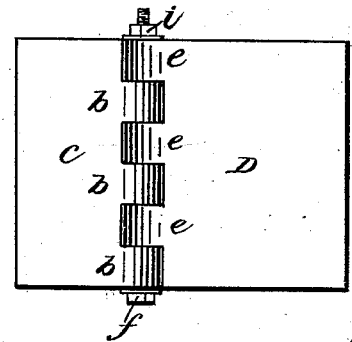

Figure 1 is a perspective of an amalgamating-pan provided with one of my deflectors or wings. Fig. 2 is a plan view of the deflector, and Fig. 3 is an elevation of the same.

Let A represent an amalgamating-pan. On the inside of the pan, wherever it is desired to attach a wing or deflector, I either form a pair or series of knuckles, *b*, or attach a plate, C, to the pan, on which the knuckles are formed.

The wing or deflector D, I provide with a corresponding pair or series of knuckles, *e*, on one end, so that the two pairs or series of knuckles can be interlocked with each other, like the knuckles of a hinge. The knuckles are perforated, and a pintle or bolt, *f*, passes through them. This pintle has a nut, *i*, on its upper end, so that by tightening the nut upon the upper knuckle the hinged wing or deflector will be fixed sufficiently firm to resist the current of the pulp and throw it to the center in the usual way.

By loosening the nut the wing or deflector can be set at any desired angle by the attendant, and secured in that position by tightening the nut again. As above stated, this is but one of the numerous ways that might be mentioned for permitting the angle of the deflector to be changed.

I do not confine myself to any particular style of hinge or joint, as the wing might be made flexible and means provided for forcing it to the desired position and holding it; but this would not require invention.

Having thus described my invention, what I claim, and desire to secure by Letters Patent, is—

1. The combination, with an amalgamating-pan, of one or more adjustable wings or deflectors, D, fitted upon a pintle provided with an adjusting and holding nut, *i*, substantially as and for the purpose set forth.

2. The combination, with an amalgamating-pan, of the adjustable deflector D and plate C, connected to the pan, and having a pintle, to which the deflector is hinged, and provided with a holding and adjusting nut, *i*, substantially as and for the purpose set forth.

In witness whereof I have hereunto set my hand and seal.

EZRA COLEMAN. [L. S.]

Witnesses:
W. FLOYD DUCKETT,
D. B. LAWLER.